US009251362B2

(12) United States Patent
Nimura et al.

(10) Patent No.: US 9,251,362 B2
(45) Date of Patent: Feb. 2, 2016

(54) MEDIUM FOR STORING CONTROL PROGRAM, CLIENT APPARATUS, AND CONTROL METHOD FOR CLIENT APPARATUS

(75) Inventors: Kazuaki Nimura, Kawasaki (JP); Hidenobu Ito, Kawasaki (JP); Yosuke Nakamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 316 days.

(21) Appl. No.: 13/606,313

(22) Filed: Sep. 7, 2012

(65) Prior Publication Data

US 2013/0103743 A1 Apr. 25, 2013

(30) Foreign Application Priority Data

Oct. 25, 2011 (JP) ................................ 2011-234425

(51) Int. Cl.
*G06F 15/16* (2006.01)
*G06F 21/62* (2013.01)
*G06F 15/173* (2006.01)

(52) U.S. Cl.
CPC .................................. *G06F 21/6218* (2013.01)

(58) Field of Classification Search
CPC .................................................. G06F 21/6218
USPC ............ 707/600; 709/213, 223, 203; 717/174
See application file for complete search history.

(56) References Cited

U.S. PATENT DOCUMENTS 6,553,375 B1 4/2003 Huang et al.
7,849,507 B1 * 12/2010 Bloch et al. .................... 726/22
2004/0260939 A1 12/2004 Ichikawa et al.
2005/0188223 A1 * 8/2005 Hasegawa et al. ............ 713/201
2006/0048227 A1 3/2006 Ohta et al.
2006/0090192 A1 * 4/2006 Corby et al. ...................... 726/1
2009/0288166 A1 * 11/2009 Brown et al. .................. 726/23
2010/0313269 A1 * 12/2010 Ye .................................. 726/24
2012/0278892 A1 * 11/2012 Turbin ........................... 726/24
2013/0042294 A1 * 2/2013 Colvin et al. ..................... 726/1
2013/0061316 A1 * 3/2013 Iskin et al. ...................... 726/18

FOREIGN PATENT DOCUMENTS

JP 2000-163269 6/2000
JP 2004-302963 10/2004
JP 2011-501278 1/2011
JP 4643204 3/2011

OTHER PUBLICATIONS

Japanese Office Action dated Feb. 24, 2015 in corresponding Japanese Patent Application No. 2011-234425.

* cited by examiner

*Primary Examiner* — Hee Soo Kim
(74) *Attorney, Agent, or Firm* — Staas & Halsey LLP

(57) ABSTRACT

A computer-readable storage medium that stores a control program for a client apparatus connectable to a repeater storing execute permission information on a plurality of codes included in an application program received from a server, the control program causing the client apparatus to execute a process including receiving the application program and the execute permission information from the repeater, updating the execute permission information received from the repeater based on evaluation information on the application program received from the repeater, and executing the application program based on the execute permission information updated based on the evaluation information.

5 Claims, 15 Drawing Sheets

| OBJECT | METHOD | EXTRACTION PARAMETER | ACL DESCRIPTION RULE |
|---|---|---|---|
| camera | captureImage | NONE | <feature name = "http://wacapps.net/api/camera"/> |
| XMLhttpRequest | open | SECOND ARGUMENT | <access origin = “open second argument of open” |

FIG. 7

·EXTRACT THE FOLLOWING FROM SOURCES OF APPLICATION (html, javascript)
·DEVICE ACCESS (CAMERA)
—camera object, captureImage OF WAC

```
var mainCamera;
...
var camopts = {destinationFilename:"images/a.jpg",highres:true};
var op;
...
op = mainCamera.captureImage(onCaptureImageSuccess, onCaptureImageError, camopts)
```

·ACCESS TO EXTERNAL SITE
—SECOND ARGUMENT OF javascript XMLHttpRequest

```
var hReq = new XMLHttpRequest();
hReq.open("GET",http://hogehoge.com,TRUE);
```

—anchor TAG of html <a href="URL">
—"location.href="URL"" OF javascript

FIG. 8

·EXAMPLE OF ACL IN CONFORMITY WITH WAC

```
<?xml version="1.0" encoding="UTF-8"?>
<widget xmlns="http://www.w3.org/ns/widgets" xmlns:wac="http://wacapps.net/ns/widgets"
id="http://example.org/helloworld" version="1.0 Beta" height="200" width="300"
viewmodes="floating" wac:min-version="2.0">
  <icon src="icon.png"/>
  <content src="helloworld.html" encoding="UTF-8"/>
  <access origin="http://www.aaabbb.com/*"/>
  <access origin="http://www.aaabbb.co.jp/*"/>        ⇒ PERMITTED URL
  <feature name="http://wacapps.net/api/camera"/>     ⇒ PERMIT CAMERA DEVICE
  <name short="HelloWorld">Hello World</name>
  <description>Hello World Widget.</description>
  <license href="http://license.example.org/">Example license Copyright (c) 2011.</license>
  <author email="myname@host" href="http://foo-bar.example.org/">myname</author>
</widget>
```

| RESOURCES | App A | App B | App C | DANGER DETERMINATION RESULT |
|---|---|---|---|---|
| EXTERNAL MEMORY | 0 | 0 | 0 | 0 (OK) |
| CAMERA | 0 | 1 | 0 | 1 (NG) |
| INTERNAL MEMORY | 0 | 0 | 0 | 0 |
| RAM | 0 | 0 | 0 | 0 |
| NFC | 0 | 0 | 0 | 0 |
| NETWORK (WLAN IN-COMPANY/OUT-COMPANY) | 0 | 0 | 0 | 0 |
| SD (SD UNMOUNTED OR DIFFERENT SD) | 0 | 0 | 0 | 0 |
| ... | ... | ... | ... | ... |

| RESOURCES | DANGER DETERMINATION RESULT |
|---|---|
| EXTERNAL MEMORY | 0 (OK) |
| CAMERA | 1 (NG) |
| INTERNAL MEMORY | 0 |
| RAM | 0 |
| NFC | 0 |
| NETWORK (WLAN IN-COMPANY/OUT-COMPANY) | 0 |
| SD (SD UNMOUNTED OR DIFFERENT SD) | 0 |
| ... | ... |

FIG. 13

·EXAMPLE OF ACL IN AFTER UPDATE

```
<?xml version="1.0" encoding="UTF-8"?>
<widget xmlns="http://www.w3.org/ns/widgets" xmlns:wac="http://wacapps.net/ns/widgets"
id="http://example.org/helloworld" version="1.0 Beta" height="200" width="300"
viewmodes="floating" wac:min-version="2.0">
  <icon src="icon.png"/>
  <content src="helloworld.html" encoding="UTF-8"/>
  <access origin="http://www.aaabbb.com/*"/>
  <access origin="http://www.aaabbb.co.jp/*"/>
  <feature name="http://wacapps.net/api/camera"/>
  <feature name="http://wacapps.net/api/deviceapis"/>
  <name short="HelloWorld">Hello World</name>
  <description>Hello World Widget.</description>
  <license href="http://license.example.org/">Example license Copyright (c) 2011.</license>
  <author email="myname@host" href="http://foo-bar.example.org/">myname</author>
</widget>
```

PERMITTED URL

DELETE

MEDIUM FOR STORING CONTROL PROGRAM, CLIENT APPARATUS, AND CONTROL METHOD FOR CLIENT APPARATUS

CROSS-REFERENCE TO RELATED APPLICATION

This application is based upon and claims the benefit of priority of the prior Japanese Patent Application No. 2011-234425, filed on Oct. 25, 2011, the entire contents of which are incorporated herein by reference.

FIELD

The embodiment discussed herein is related to a medium for storing control program, a client apparatus, and a control method for the client apparatus.

BACKGROUND

Smart phones which are mobile terminals having the usual capabilities of a personal computer are prevailing. With enriched 3G, LTE (Long Term Evolution), hot spots and the like, smart phones are usable in a rich environment which permits the smart phones to be easily connectable to a network. There are three kinds of applications that may run on smart phones, namely, a native application, a Web application, and a Hybrid Mobile Application.

The native application is a specialized application or special-purpose application for a terminal that executes the application. Because this native application may freely handle local resources and devices of a terminal, it has to be installed in the terminal to be specialized therefor, so that a developer has to create a custom-designed application for each terminal. The Web application runs on a browser, and does not have to be installed in a terminal, so that execution of the Web application does not depend on a terminal or an OS (Operating System). However, the Web application runs on a Web server, not a terminal, in principle, the feasible operation of local resources is limited to a file operation or the like using the File API of JavaScript (registered trademark) as compared to the native application. The Hybrid Mobile Application may be created in a development environment such as PhoneGap or WAC (Wholesale Applications Community), and, unlike the Web application, may be executed without depending on an OS. In addition, like the native application, the Hybrid Mobile Application may freely access local resources or devices.

Japanese Laid-open Patent Publication No. 2000-163269 discloses an example of related art.

SUMMARY

According to an aspect of the invention, a computer-readable storage medium stores a control program for a client apparatus connectable to a repeater storing execute permission information on a plurality of codes included in an application program received from a server. The control program causes the client apparatus to execute a process including receiving the application program and the execute permission information from the repeater, updating the execute permission information received from the repeater based on evaluation information on the application program received from the repeater, and executing the application program based on the execute permission information updated based on the evaluation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an analysis rule;

FIG. 7 is a diagram illustrating a code extraction routine;

FIG. 8 is a diagram illustrating an ACL;

FIG. 12 is a diagram illustrating a danger determination table;

FIG. 13 is a diagram illustrating an ACL after update;

DESCRIPTION OF EMBODIMENT

The Hybrid Mobile Application is not specialized for a terminal, and may access a device to which a terminal is accessible. Accordingly, the Hybrid Mobile Application has a merit such that in spite of being like a general-purpose application, the Hybrid Mobile Application may access a device associated with a terminal. When such an application is executed, however, a security problem may occur. One of major causes is malware which is apparently becoming popular in smart phones. Applications including malware are apt to increase. There are increased cases where users install applications including malware in smart phones, and execute the applications. To push an application, a user may not feel safe in using the application unless a proper security measurement is taken. It is dangerous to transmit an application to a terminal without checking the security status of the terminal.

Hereinafter, an information processing system according to an embodiment of the disclosure is described.

Figure 1:
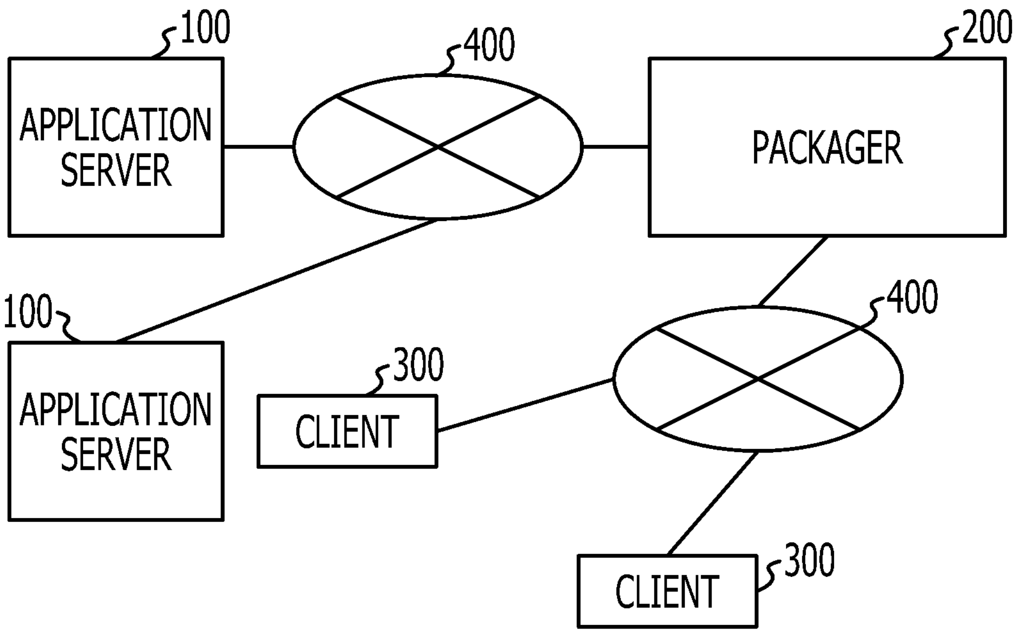
FIG. 1 is a diagram illustrating an information processing system.

FIG. 1 is a diagram illustrating the information processing system according to the embodiment. The information processing system includes a plurality of application servers 100, a plurality of networks 400, a packager 200 which is a repeater, and a plurality of client apparatuses 300. The application servers 100, the packager 200 and the client apparatuses 300 are connected to one another over the network 400.

The application server 100 opens a Web application to the public. The packager 200 analyzes the Web application to generate an ACL (Application Control List), and opens the generated ACL and the Web application in association with each other. The ACL is to be described later. The client apparatus 300 executes an application. The structure that includes the application server 100, the packager 200 and the client apparatus 300 may serve as the smallest configuration of the information processing system.

Figure 2:
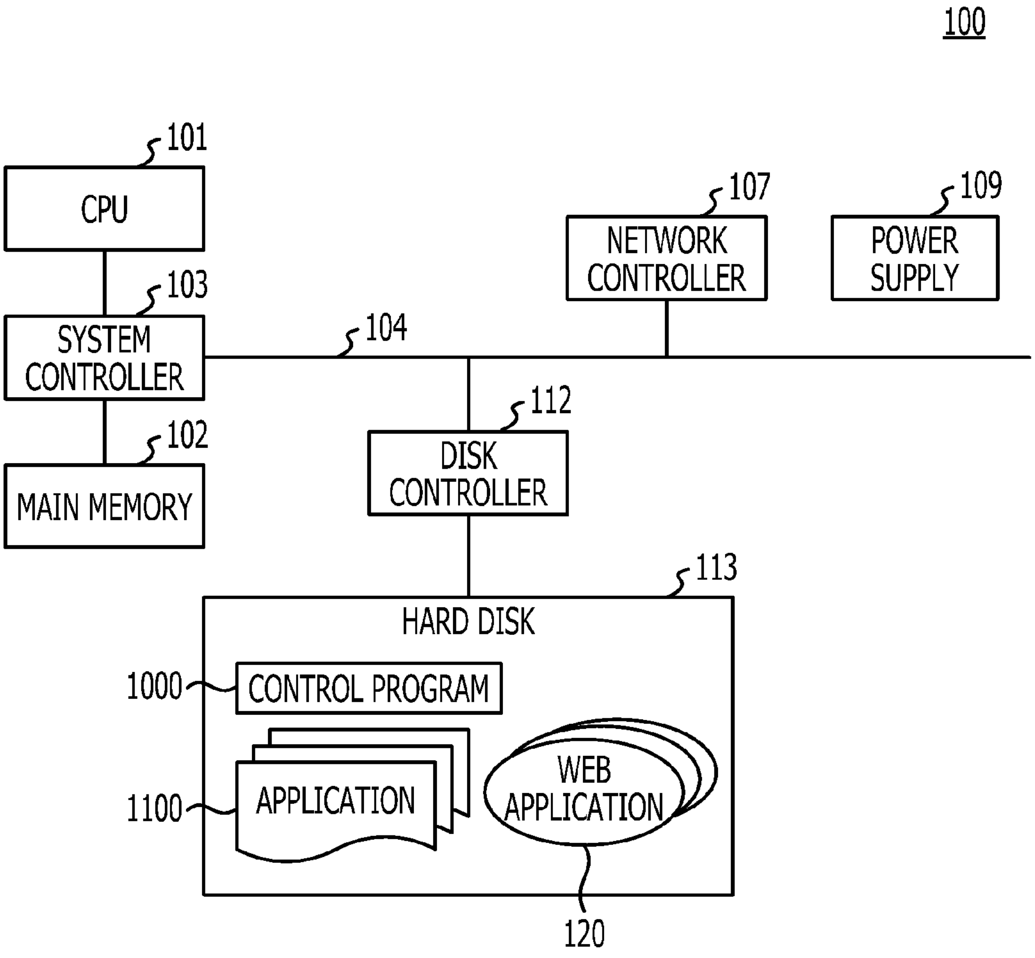
FIG. 2 is a block diagram illustrating the configuration of an application server.

Referring to FIG. 2, the application server 100 according to the embodiment is described. The application server 100 includes a CPU (Central Processing Unit) 101, a main memory 102, a system controller 103, a bus 104, a network controller 107, a power supply 109, a disk controller 112, and a hard disk 113. The application server 100 is controlled by the CPU 101.

The CPU 101 and the main memory 102 are connected with the system controller 103. The system controller 103 controls data transfer between the CPU 101 and the main memory 102, and data transfer between the CPU 101 and the bus 104. The system controller 103 is further connected with the network controller 107 and the disk controller 112 by the bus 104.

At least a part of an OS program or an application program which are executed by the CPU 101 is temporarily stored in the main memory 102. Further, the main memory 102 stores various kinds of data to be used for the processing which is executed by the CPU 101. A RAM (Random Access Memory), for example, is used for the main memory 102.

The disk controller 112 is connected with the hard disk 113. The disk controller 112 controls the hard disk 113. The hard disk 113 stores an application program 1100 that the CPU 101 executes on the main memory 102, a control program 1000 that allows the CPU 101 to control invoking or the like of the application program 1100, a Web application 120 to be opened to the public, and various kinds of data.

The network controller 107 is connected to the packager 200 over the network 400 illustrated in FIG. 1 to exchange the Web application 120 and various kinds of data with the packager 200.

The power supply 109 supplies power to individual hardware in the application server 100 via an unillustrated power supply line.

The aforementioned hardware structure may achieve the processing functions of the application server 100.

Figure 3:
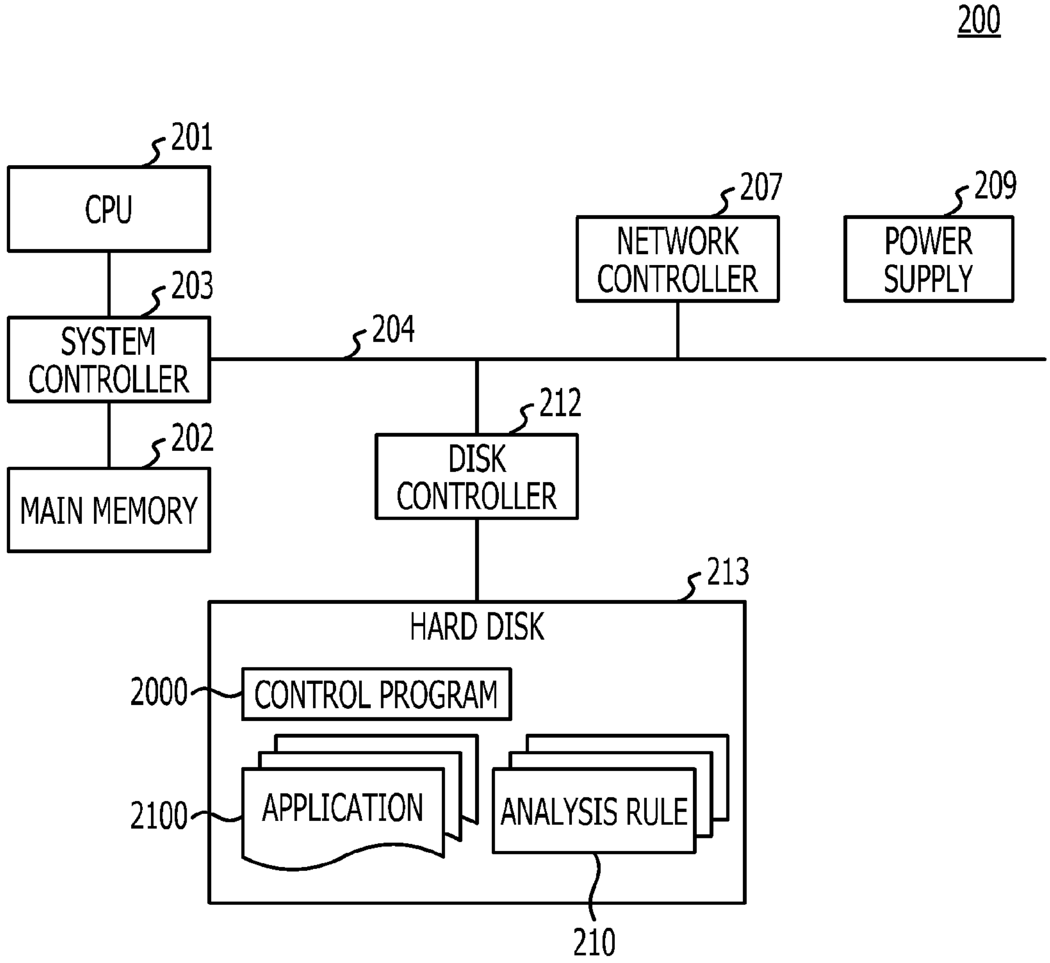
FIG. 3 is a block diagram illustrating the configuration of a packager.

Referring to FIG. 3, the packager 200 according to the embodiment is described. The packager 200 includes a CPU 201, a main memory 202, a system controller 203, a bus 204, a network controller 207, a power supply 209, a disk controller 212, and a hard disk 213. The packager 200 is controlled by the CPU 201.

The CPU 201 and the main memory 202 are connected with the system controller 203. The system controller 203 controls data transfer between the CPU 201 and the main memory 202, and data transfer between the CPU 201 and the bus 204. The system controller 203 is further connected with the network controller 207 and the disk controller 212 by the bus 204.

At least a part of an OS program or an application program which are executed by the CPU 201 is temporarily stored in the main memory 202. Further, the main memory 202 stores various kinds of data to be used for the processing which is executed by the CPU 201. A RAM, for example, is used for the main memory 202.

The disk controller 212 is connected with the hard disk 213. The disk controller 212 controls the hard disk 213. The hard disk 213 stores an application program 2100 that the CPU 201 executes on the main memory 202, a control program 2000 that allows the CPU 201 to control invoking or the like of the application program 2100, an analysis rule 210, an ACL 230 (not illustrated), and various kinds of data (not illustrated).

The network controller 207 is connected to the application server 100 and the client apparatus 300 over the network 400 illustrated in FIG. 1 to exchange data with the application server 100 and the client apparatus 300.

The power supply 209 supplies power to individual hardware in the packager 200 via an unillustrated power supply line.

The aforementioned hardware structure may achieve the processing functions of the packager 200.

Figure 4:
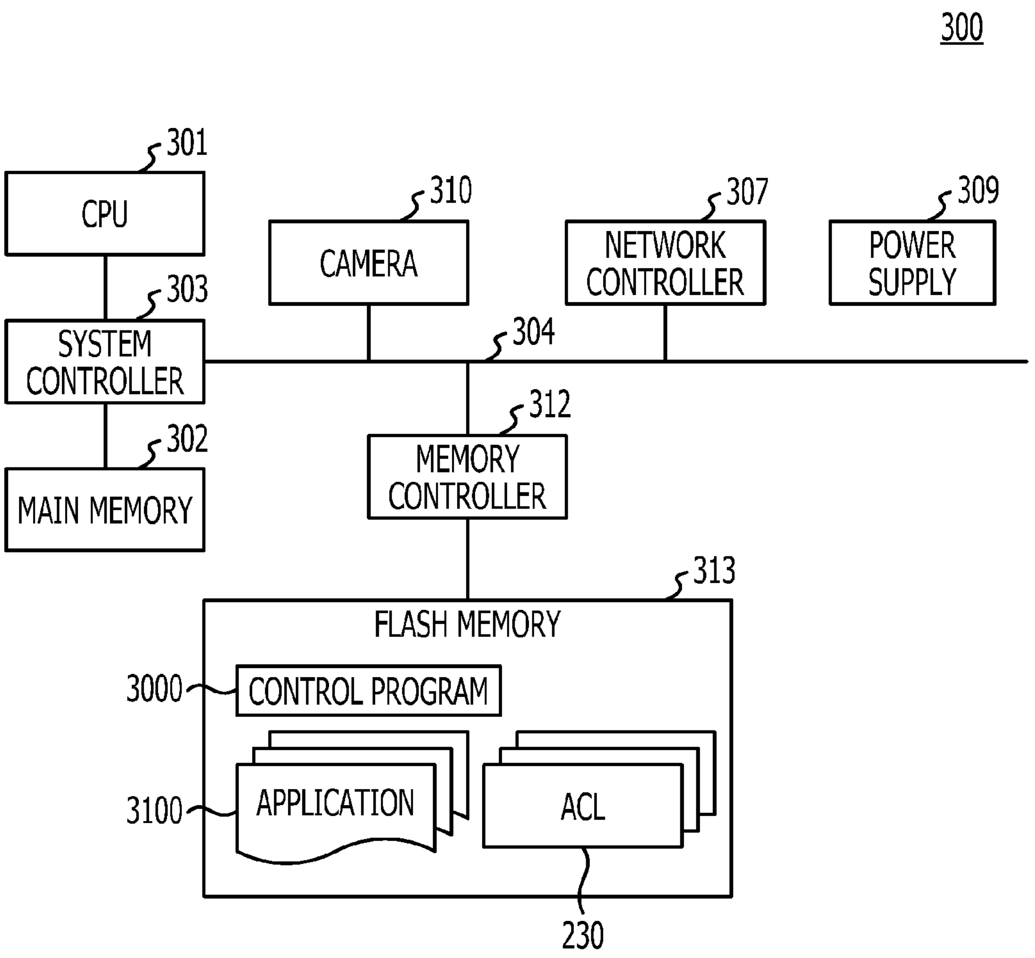
FIG. 4 is a block diagram illustrating the configuration of a client apparatus.

Referring to FIG. 4, the client apparatus 300 according to the embodiment is described. The client apparatus 300 includes a CPU 301, a main memory 302, a system controller 303, a bus 304, a network controller 307, a power supply 309, a camera 310, a memory controller 312, and a flash memory 313. The client apparatus 300 is controlled by the CPU 301.

The CPU 301 and the main memory 302 are connected with the system controller 303. The system controller 303 controls data transfer between the CPU 301 and the main memory 302, and data transfer between the CPU 301 and the bus 304. The system controller 303 is further connected with the network controller 307 and the memory controller 312 by the bus 304.

At least a part of an OS program or an application program which are executed by the CPU 301 is temporarily stored in the main memory 302. Further, the main memory 302 stores various kinds of data to be used for the processing which is executed by the CPU 301. A RAM, for example, is used for the main memory 302.

The memory controller 312 is connected with the flash memory 313. The memory controller 312 controls the flash memory 313. The flash memory 313 stores an application program 3100 that the CPU 301 executes on the main memory 302, a control program 3000 that allows the CPU 301 to control invoking or the like of the application program 3100, and various kinds of data. The flash memory 313 stores the Web application 120 and the ACL 230, which are received from the packager 200, and an engine for building an application executing environment.

The network controller 307 is connected to the packager 200 over the network 400 illustrated in FIG. 1 to exchange data with the packager 200.

The camera 310 captures an image, and stores the captured image in the flash memory 313.

The power supply 309 supplies power to individual hardware in the client apparatus 300 via an unillustrated power supply line.

The aforementioned hardware structure may achieve the processing functions of the client apparatus 300.

Figure 5:
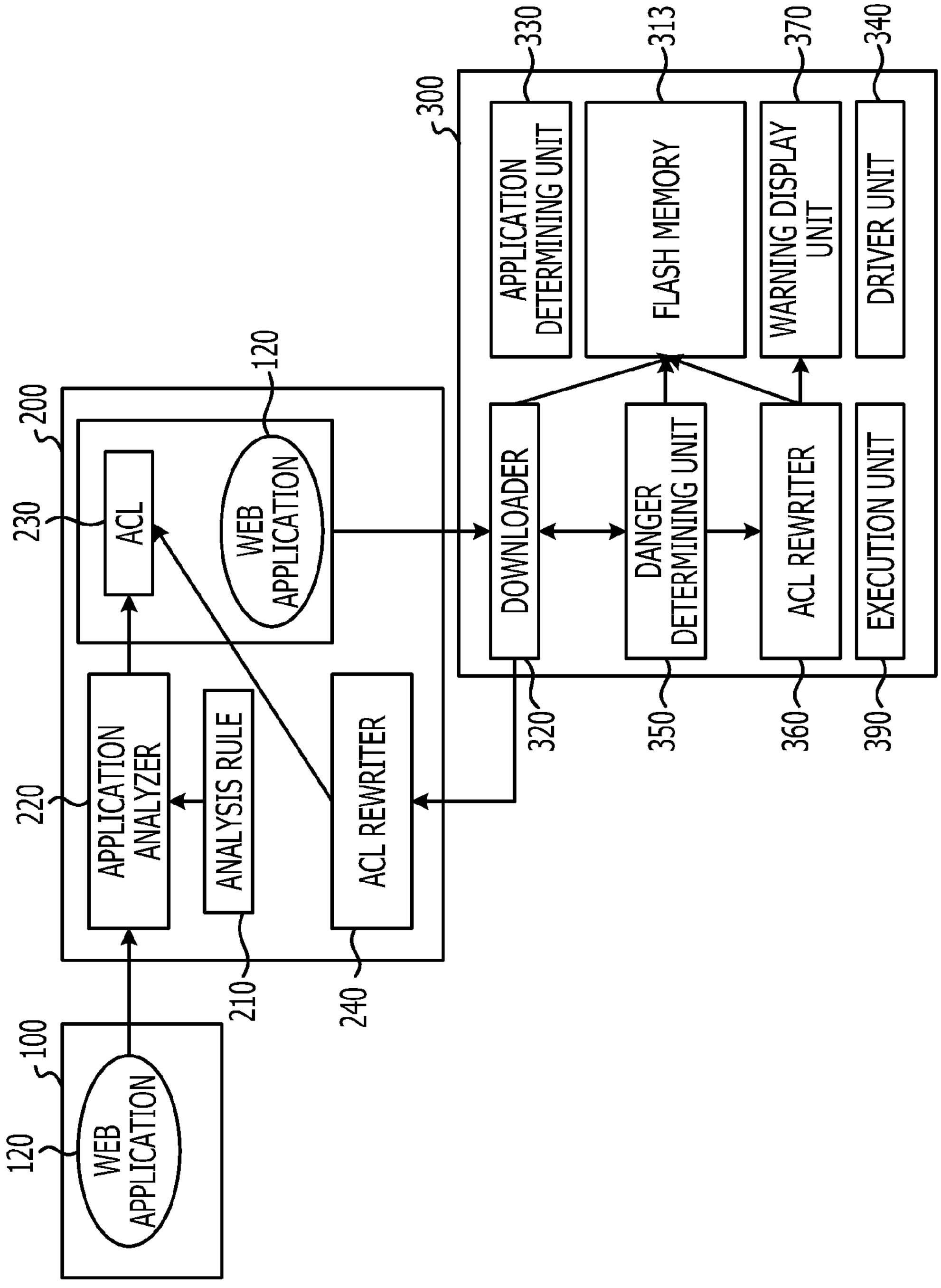
FIG. 5 is a diagram illustrating the details of the information processing system.

FIG. 5 is a diagram illustrating the information processing system according to the embodiment. The individual blocks illustrated in FIG. 5 are achieved as the CPU 201 of the packager 200 executes the application program 2100 and the CPU 301 of the client apparatus 300 executes the application program 3100.

The packager 200 includes an application analyzer 220, the analysis rule 210, the ACL 230, and an ACL rewriter 240. The application analyzer 220 analyzes the Web application 120 received from the application server 100 based on the analysis rule 210 to generate the ACL 230. The analysis rule 210 describes a device access or site access to be extracted from the Web application 120 to the ACL 230. The ACL 230 is a list of devices and sites which is permitted to be accessed. The ACL rewriter 240 rewrites the ACL 230 based on notification from a downloader 320. The details of the downloader 320 are to be described later.

The client apparatus 300 includes the flash memory 313, the downloader 320, an application determining unit 330, a driver unit 340, a danger determining unit 350, an ACL rewriter 360, a warning display unit 370, and an execution unit 390.

The downloader 320 receives the Web application 120 and the ACL 230 from the packager 200. Referring to the ACL 230 received by the downloader 320, the application determining unit 330 restricts accessing when the Web application 120 received by the downloader 320 accesses a device or a site. The driver unit 340 controls the interface of the client apparatus 300. The packager 200 may use an encryption key or the like for the ACL 230 to detect manipulation of the ACL 230.

FIG. 6 illustrates an example of the analysis rule 210. The analysis rule 210 has an object 2101, a method 2102, an extraction parameter 2103, and an ACL description rule 2104. The object 2101 indicates a device or an external site whose access is to be restricted. The method 2102 indicates an operation. The extraction parameter 2103 indicates information to be extracted from a function name. The ACL description rule 2104 indicates information to be added to the ACL 230.

Referring to FIG. 7, the process of the application analyzer 220 to extract a code is described. The application analyzer 220 extracts a specific code from the source of an application written by HTML (HyperText Markup Language) or javascript. The application analyzer 220 extracts a camera object and captureImage of a WAC as a device access. According to the embodiment, the application analyzer 220 extracts mainCamera.captureImage (on CaptureImageSuccess, on CaptureImageError, camopts) from the source of the application. The application analyzer 220 also extracts a second argument from javascript XMLHttpRequest as an access to an external site. According to the embodiment, the application analyzer 220 extracts http://hogehoge.com from the source of the application.

FIG. 8 illustrates an example of the ACL 230. Based on the analysis rule 210, the application analyzer 220 describes permitted URLs in <access origin="http://www.aaabbb.com/*"/> and <access origin="http://www.aaabbb.co.jp/*"/> illustrated in FIG. 8. Based on the analysis rule 210, the application analyzer 220 also describes a permitted device name in <feature name="http://wacapps.net/api/camera"/> illustrated in FIG. 8.

Figure 9:
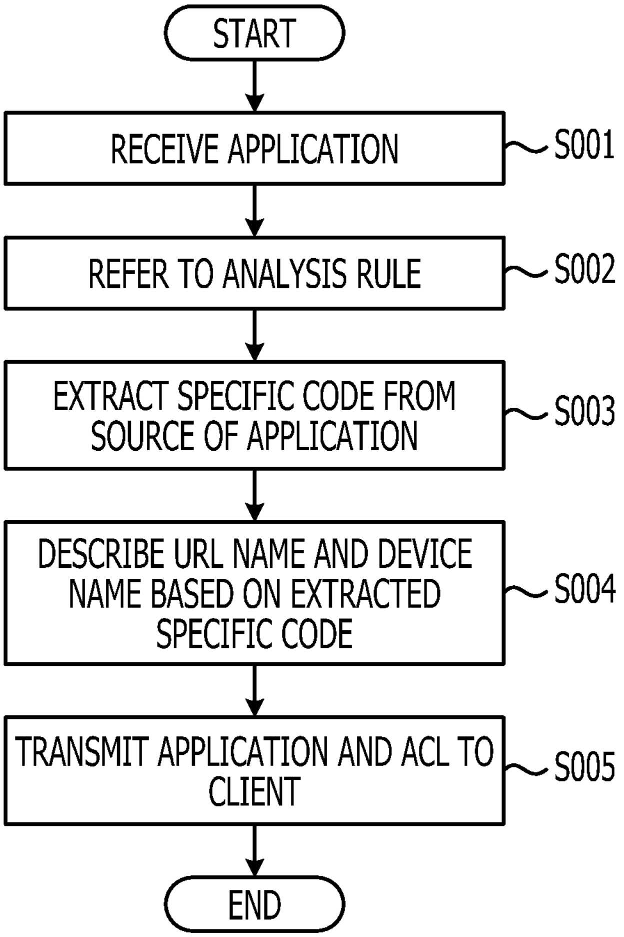
FIG. 9 is a flowchart illustrating the process of the packager.

FIG. 9 illustrates the process of the packager 200.

In S001, the application analyzer 220 receives the Web application 120 from the application server 100. Then, the application analyzer 220 moves the process to S002.

In S002, the application analyzer 220 refers to the analysis rule 210. Then, the application analyzer 220 moves the process to S003.

In S003, the application analyzer 220 extracts a specific code from the Web application 120 based on the analysis rule 210. Specifically, the application analyzer 220 extracts a specific code from the source described referring to FIG. 7. Then, the application analyzer 220 moves the process to S004.

In S004, the application analyzer 220 describes, in the ACL 230, an URL name and a device name which are permitted to be accessed. Specifically, the application analyzer 220 describes the permitted URL name and device name in the ACL 230 described referring to FIG. 8. Then, the application analyzer 220 moves the process to S005.

In S005, the application analyzer 220 transmits the Web application 120 and the ACL 230 describing the URL name and device name which are permitted to be accessed to the client apparatus 300. Then, the application analyzer 220 terminates the process.

Figure 10:
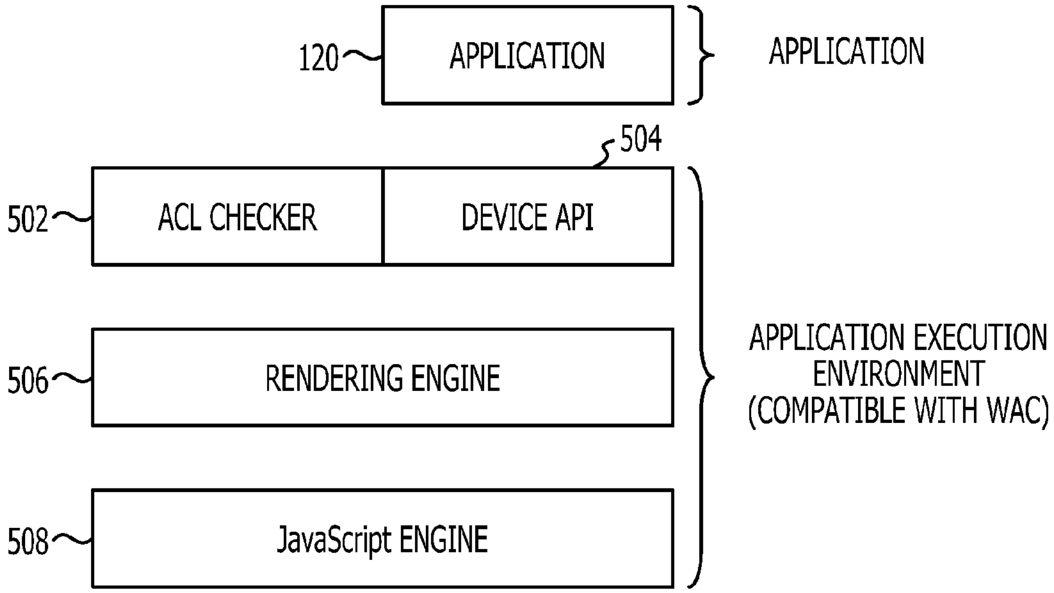
FIG. 10 is a diagram illustrating an execution environment for the client apparatus.

FIG. 10 illustrates the relation between the WAC-compatible application execution environment the client apparatus 300 has, and an application. The application execution environment is created as the CPU 301 executes, on the main memory 302, an engine stored in the flash memory 313 of the client apparatus 300. The CPU 301 executes the engine on the main memory 302 to process a JavaScript engine 508 to thereby execute a program written in JavaScript. The CPU 301 executes the engine on the main memory 302 to process a rendering engine 506 to thereby display HTML to be installed in a browser or the like. According to the embodiment, the CPU 301 uses the rendering engine 506 as a module to acquire an event, for example, when a network access occurs. The CPU 301 executes the engine on the main memory 302 to process a device API (Application Program Interface) 504, thereby allowing a device compatible with WAC 2.0 to access the Web application 120. The Web application 120 is executed on an upper-rank layer of the device API 504. The CPU 301 executes the engine on the main memory 302 to process a ACL checker 502 to thereby check the ACL 230 in run time.

The danger determining unit 350 inquires about danger determination of a terminal on a program to acquire a current danger determination result, and notifies the downloader 320 and the ACL rewriter 360 of the danger determination result. For example, the danger determining unit 350 analyzes an application name and which resource is to be influenced from information disclosed by an anti-virus vendor. In addition, for example, the danger determining unit 350 analyzes an application name and which resource is to be influenced from anti-virus related information stored by a service provider. The information disclosed by an anti-virus vendor has only to be acquired from an external server disclosing the information over the network 400 by the downloader 320, and stored in the flash memory 313. In addition, the information processing system may be configured in such a way that anti-virus related information stored by a service provider is stored in the flash memory 313 beforehand.

Figure 11:
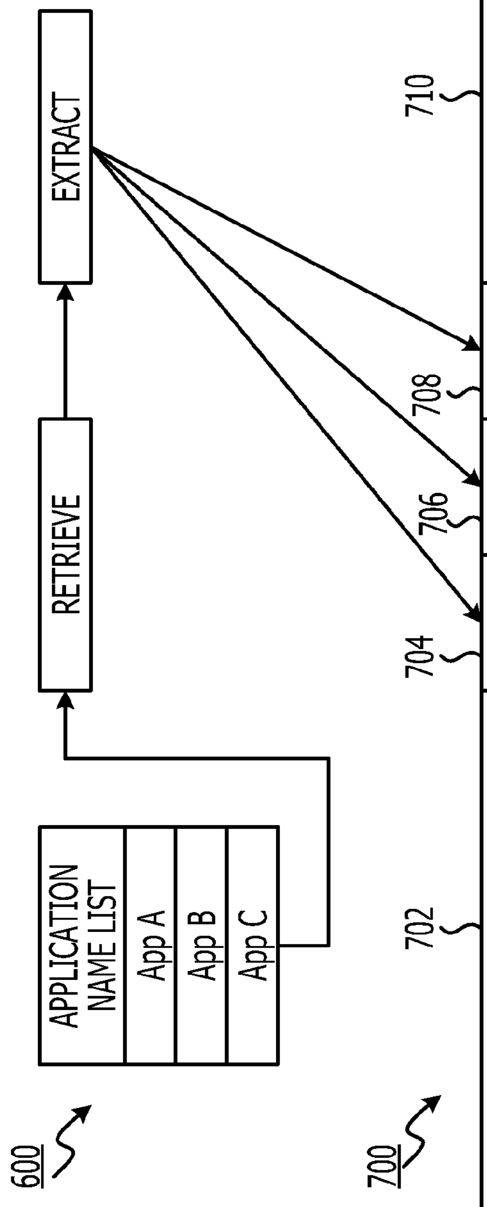
FIG. 11 is a diagram illustrating a danger determination routine.

FIG. 11 illustrates a danger determination routine to be executed by the danger determining unit 350. The danger determining unit 350 acquires the names of applications installed in the client apparatus 300 from an application name list table 600. According to the embodiment, three applications with an application name "APP A", application name "APP B", and an application name "APP C" are installed in the client apparatus 300.

The danger determining unit 350 retrieves reputations of individual applications from information disclosed by a security vendor, evaluation by users, etc. The danger determining unit 350 extracts the influential condition on each resource from the retrieval results. The danger determining unit 350 generates a danger determination preliminary table 700. The danger determination preliminary table 700 has a resource 702, "APP A" 704, "APP B" 706, "APP C" 708, and danger determination result 710. The resource 702 indicates resources the client apparatus 300 has. The danger determining unit 350 writes "1" in the "APP A" 704, the "APP B" 706 and the "APP C" 708 resource by resource when the respective applications exert dangerous influences on the resources, and writes "0" in the "APP A" 704, the "APP B" 706 and the "APP C" 708 resource by resource when the respective applications do not exert dangerous influences on the resources. When "1" is written in any one of the "APP A" 704, the "APP B" 706 and the "APP C" 708, the danger determining unit 350 decides that it is dangerous to use the associated resource on the client apparatus 300, and writes "1" in the danger determination result 710. When "0" is written in all of the "APP A" 704, the "APP B" 706 and the "APP C" 708, the danger determining unit 350 decides that it is safe to use the associated resource on the client apparatus 300, and writes "0" in the danger determination result 710.

The danger determining unit 350 may determine a dangerous resource from the list of applications installed in the client apparatus 300, and reputations on the applications. For example, when a certain application is dangerous and information on what kind of attack it makes is acquired from a security vendor or over the Internet, the danger determining unit 350 corrects the ACL 230 to inhibit access to the dangerous resource. In addition, the danger determining unit 350 may rewrite the ACL 230 according to the context. For example, the danger determining unit 350 may dynamically rewrite the ACL 230 to inhibit access to a camera device when the user of the client apparatus 300 is present in an office, or may dynamically rewrite the ACL 230 to inhibit access to information inside an office beyond the firewall when the user of the client apparatus 300 is out of office.

FIG. 12 illustrates a danger determination table 800. The danger determining unit 350 invokes a danger determination routine on the program to acquire the danger determination table 800. The danger determination table 800 has a resource 802 and a danger determination result 804. The danger determining unit 350 decides from the danger determination table 800 that it is dangerous to use a camera on the client apparatus 300 where the "APP A", the "APP B" and "APP C" are installed. It is apparent from the danger determination table 800 that it is likely that a malicious application which captures images from a camera without authorization has already been installed in the client apparatus 300, and the use of the camera at present is very dangerous. The danger determining unit 350 requests the ACL rewriter 360 to rewrite the ACL 230. Further, the danger determining unit 350 request the ACL rewriter 240 of the packager 200 via the downloader 320 to rewrite the ACL 230.

FIG. 13 illustrates an example of the ACL 230 after update. The ACL rewriter 360 deletes <feature name="http://wacapps.net/api/camera"/> from the ACL 230 illustrated in FIG. 8 in response to the request from the danger determining unit 350. This does not allow the application to use the camera on the client apparatus 300, thereby enhancing the security. Likewise, the danger determining unit 350 requests the ACL rewriter 240 of the packager 200 to rewrite the ACL 230. The ACL rewriter 240 of the packager 200 updates the ACL 230 in response to the request from the danger determining unit 350. The ACL rewriter 360 updates the ACL 230, and displays, on the warning display unit 370, information indicating that the client apparatus 300 is in danger.

The warning display unit 370 displays the information indicating that the client apparatus 300 is in danger in response to a command from the ACL rewriter 360. The execution unit 390 executes an application.

Figure 14:
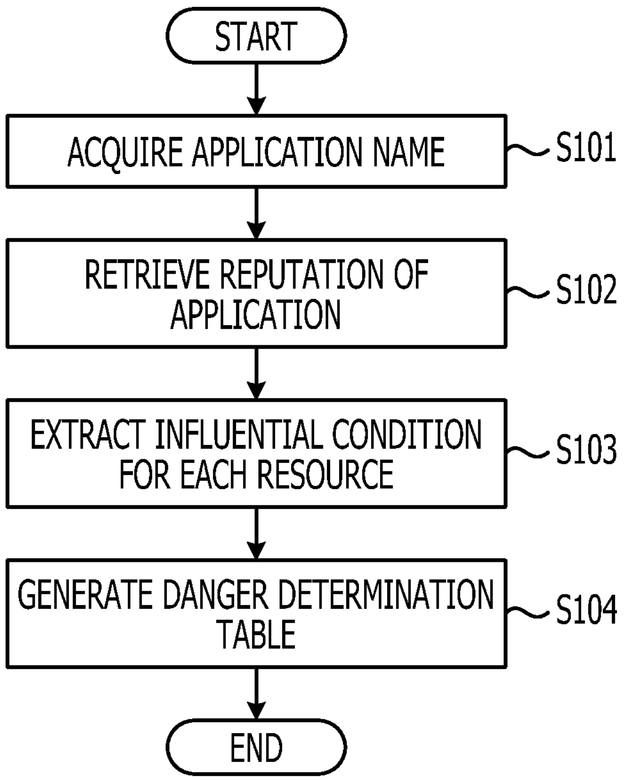
FIG. 14 is a flowchart illustrating the process of a danger determining unit.

FIG. 14 illustrates the process of the danger determining unit 350.

In S101, the danger determining unit 350 acquires the names of applications installed in the client apparatus 300 from the application name list table 600. Then, the danger determining unit 350 moves the process to S102.

In S102, the danger determining unit 350 retrieves reputations on applications corresponding to the application names acquired in S101 from information or the like disclosed by a security vendor. Then, the danger determining unit 350 moves the process to S103.

In S103, the danger determining unit 350 extracts an influential condition on each resource based on the result of retrieval in S102. Then, the danger determining unit 350 moves the process to S104.

In S104, the danger determining unit 350 generates the danger determination table 800 based on the result of extraction in S103. Then, the danger determining unit 350 terminates the process.

Figure 15:
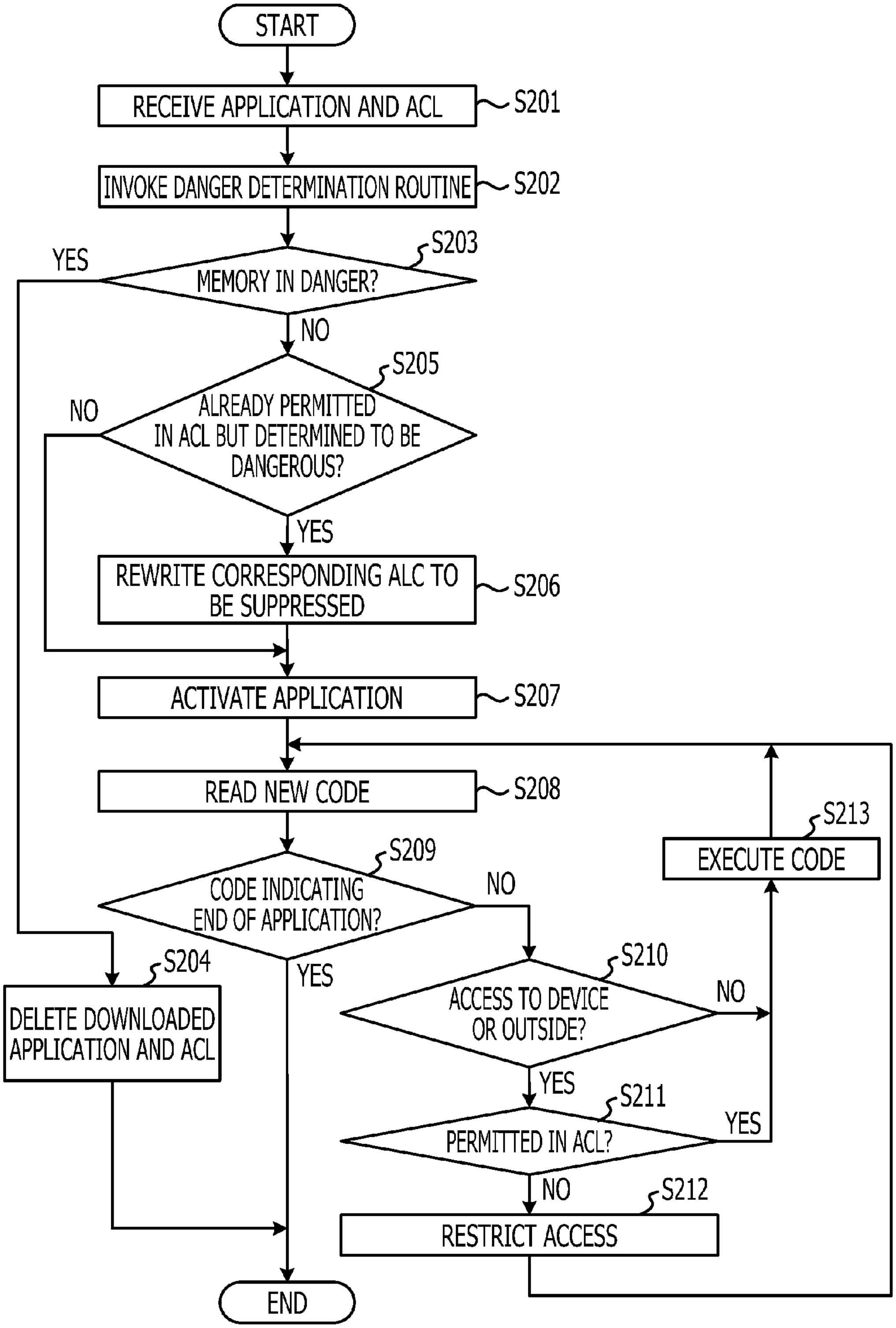
FIG. 15 is a flowchart illustrating the process of the client apparatus.

FIG. 15 illustrates the process of the client apparatus 300.

In S201, the downloader 320 receives the Web application 120 and the ACL 230 from the packager 200. The downloader 320 stores the received Web application 120 and ACL 230 in the flash memory 313. Then, the downloader 320 moves the process to S202.

In S202, the danger determining unit 350 invokes the danger determination routine. Then, the danger determining unit 350 moves the process to S203.

In S203, the danger determining unit 350 determines whether the memory is in danger by referring to the danger determination table 800. When the memory is in danger, the danger determining unit 350 moves the process to S204. When the memory is not in danger, the danger determining unit 350 moves the process to S205.

In S204, the danger determining unit 350 deletes the downloaded Web application 120 and ACL 230. Then, the danger determining unit 350 terminates the process.

In S205, referring to the danger determination table 800, the danger determining unit 350 determines whether there is a resource which has already been permitted by the ACL 230 but which is determined to be dangerous, the danger determining unit 350 moves the process to S206. When it is determined that there is not a resource which is determined to be dangerous, the danger determining unit 350 moves the process to S207.

In S206, the danger determining unit 350 deletes the resource determined to be dangerous from the ACL 230 to update the ACL 230. Then, the danger determining unit 350 moves the process to S207.

In S207, the application determining unit 330 receives the Web application 120 from the downloader 320, and activates the Web application 120. Then, the application determining unit 330 moves the process to S208.

In S208, the application determining unit 330 reads a new code from the activated application. Then, the application determining unit 330 moves the process to S209.

In S209, the application determining unit 330 determines whether the code read in S208 indicates the end of the application. When the read code indicates the end of the application, the application determining unit 330 terminates the process. When the read code does not indicate the end of the application, on the other hand, the application determining unit 330 moves the process to S210.

In S210, the application determining unit 330 determines whether the code to be executed is to gain access to a device or an external access. When the determination is affirmative, the application determining unit 330 moves the process to S211. When the determination is negative, on the other hand, the application determining unit 330 moves the process to S213.

In S211, referring to the updated ACL 230, the application determining unit 330 determines whether the device or URL to be accessed is permitted. When the device or URL to be accessed is permitted, the application determining unit 330 moves the process to S213. When the device or URL to be accessed is not permitted, on the other hand, the application determining unit 330 moves the process to S212.

In S213, the application determining unit 330 executes the code. Then, the application determining unit 330 returns the process to S208.

In S212, the application determining unit 330 does not execute the code which is not permitted to restrict the access. Then, the application determining unit 330 returns the process to S208 to repeat the aforementioned process.

Because the danger on the client apparatus 300 varies from time to time, the information processing system may be configured so as to push the application to the client apparatus 300 when the level of danger on the memory drops.

Alternatively, the information processing system may be configured in such a way that when an SD card is replaced with a different one in the client apparatus 300, for example, it is determined that the client apparatus 300 is in danger.

Further, the information processing system may be configured so that the client apparatus 300 determines whether or not to download an application from the packager 200 according to the level of danger of the client apparatus 300.

Furthermore, the information processing system may be configured in such a way that when the danger determining unit 350 updates the ACL 230, for example, the updated ACL 230 is stored in the packager 200 via the downloader 320. Moreover, the information processing system may be configured in such a way that, for example, a service provider stores anti-virus related information is stored in the packager 200. The centralized management of the information on the packager 200 facilitates the update work.

According to the embodiment, the source codes of a Web application are executed in order from the top as done normally. Every time a device access or a network access described in the ACL 230 occurs, the application determining unit 330 checks if such an access is permitted in the ACL 230 in run time. The application determining unit 330 permits execution of a permitted code and does not permit execution of a non-permitted code, so that an unauthorized device access or network access is not permitted while running a Web application in a normal manner. Even if an application having malware embedded therein in procedures of obtaining a Web application, open to the public on a Web server, by a normal way, reverse-assembling the Web application, mixing malware in the Web application, and repackaging and opening the malware-embedded Web application to the public is open to the public on the Web server, access to the Web application is restricted. Thus, personal information is not extracted from a terminal and not transmitted to a malicious user. Further, even if a Web application has malware embedded therein, it is possible not to execute the malware part while executing only the normal application part.

According to the embodiment, when a client terminal is in danger, it is possible to suppress power consumption and reduce the amount of network transfer by reducing unnecessary downloadings.

In addition, since enhancement of the virus checking capability as done on a personal computer makes the virus checker heavier, an approach to operate smart phones lighter is asked for. In this respect, it is possible to achieve lighter processing by using virus check on the current level of checking an application name to specify a resource which is a potential threat from the application name and performing access control based on the specified resource.

Although the information processing system according to the exemplary embodiment of the present invention has been described, it should be understood that the invention is not limited to the specifically disclosed embodiment, and may be modified and changed in various forms without departing from the scope of the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium that stores a control program for a client apparatus connected to a repeater storing execute permission information on a plurality of access codes included in an application program received from a server, the control program causing the client apparatus to execute a process including:

receiving the application program and the execute permission information from the repeater;

updating the execute permission information received from the repeater based on evaluation information;

determining whether each access code of the plurality of access codes included in the application program is permitted to be executed based on the updated execute permission information, the plurality of access codes each indicating an access to a predetermined function of the client apparatus or indicating an access to an external apparatus;

executing all access codes that are permitted to be executed, and restricting all access codes that are not permitted to be executed, wherein the evaluation information is a level of danger of the client apparatus.

2. A client apparatus connected to a repeater storing execute permission information on a plurality of access codes included in an application program received from a server, the client apparatus comprising:

a reception unit that receives the application program and the execute permission information from the repeater;

an update unit that updates the execute permission information received from the repeater based on evaluation information;

an execution unit that determines whether each access code of the plurality of access codes included in the application program is permitted to be executed based on the updated execution permission information, executes all access codes that are permitted to be executed, and restricts all access codes that are not permitted to be executed, the plurality of access codes each indicating an access to a predetermined function of the client apparatus or indicating an access to an external apparatus;

wherein the evaluation information is a level of danger of the client apparatus.

3. A client apparatus connected to a repeater storing execute permission information on a plurality of access codes included in an application program received from a server, the client apparatus comprising:

a memory that stores evaluation information on a plurality of application programs; and a processor that executes a process including receiving the application program and the execute permission information from the repeater, updating the execute permission information received from the repeater based on the evaluation information stored in the memory, determining whether each access code of the plurality of access codes included in the application program is permitted to be executed based on the updated execute permission information, the plurality of access codes each indicating an access to a predetermined function of the client apparatus or indicating an access to an external apparatus, executing all access codes that are permitted to be executed, and restricting all access codes that are not permitted to be executed, wherein the evaluation information is a level of danger of the client apparatus.

4. A control method for a client apparatus connected to a repeater storing execute permission information on a plurality of access commands included in an application program received from a server, the control method comprising:

receiving, by the client apparatus, the application program and the execute permission information from the repeater;

updating the execute permission information received from the repeater based on evaluation information; and determining whether each access command of the plurality of access commands included in the application program is permitted to be executed based on the updated execute permission information, the plurality of access commands each indicating an access to a predetermined function of the client apparatus or indicating an access to an external apparatus;

executing all access commands that are permitted to be executed, and restricting all access commands that are not permitted to be executed, wherein the evaluation information is a level of danger of the client apparatus.

5. The medium according to claim 1, wherein the repeater stores anti-virus related information, and the receiving includes receiving the anti-virus related information from the repeater.

* * * * *